United States Patent [19]

Sakamoto

[11] Patent Number: 5,386,265
[45] Date of Patent: Jan. 31, 1995

[54] DISPLAY LIGHTING DEVICE
[75] Inventor: Hiroshi Sakamoto, Kawasaki, Japan
[73] Assignee: Nikon Corporation, Tokyo, Japan
[21] Appl. No.: 6,763
[22] Filed: Jan. 21, 1993
[30] Foreign Application Priority Data Jan. 27, 1992 [JP]  Japan .................................. 4-012342

[51] Int. Cl.$^6$ .............................................. G03B 7/26
[52] U.S. Cl. .................... 354/484; 354/289.12
[58] Field of Search ............... 354/289.1, 289.12, 465, 354/471–475, 484

[56] References Cited

U.S. PATENT DOCUMENTS 5,049,917  9/1991  Yasukawa et al. ................ 354/484

FOREIGN PATENT DOCUMENTS 3-5741  11/1991  Japan .

Primary Examiner—David M. Gray
Attorney, Agent, or Firm—Oliff & Berridge

[57] ABSTRACT

A display lighting device for each of a camera and an accessory equipment of the camera performs the interlocking turning on or turning off operation between the lighting units of the camera and the accessory equipment.

When receiving a turning On signal from an operating member of the camera or receiving a turning on command from the accessory equipment through a communication circuit, the display lighting device for the camera turns on the lighting unit of the display unit, and at the same time transmits a turning on command to the accessory equipment through the communication circuit. The lighting unit of the accessory equipment is turned on when the turning on command is received thereby. In addition, when receiving a turning off signal from the operating member of the camera or receiving a turning off command from the accessory equipment through the communication circuit, the display lighting device for the camera turns off the lighting unit of the display unit, and at the same time transmits a turning off command to the accessory equipment through the communication circuit. The lighting unit of the accessory equipment is turned off when the turning off command is received thereby.

11 Claims, 5 Drawing Sheets

DISPLAY LIGHTING DEVICE

BACKGROUND OF THE INVENTION

1. Field of the Invention

This invention relates to a display lighting device for lighting a display screen of a display unit, and more particularly to the improvement of a display lighting device for each of a camera and an accessory equipment of the camera in which turning on and turning off operations of the display lighting devices of the camera and the accessory equipment are carried out interlockingly with each other.

2. Description of Related Art

There have been known display lighting devices for a camera and an accessory equipment of the camera in which when the camera and the accessory equipment are coupled to each other, the turning on and turning off operation of the display lighting device of the camera is carried out by manipulation of an operating member of the camera, and at the same time the turning on and turning off operation of the display lighting device of the accessory equipment is carried out interlockingly with the turning on and turning off operation of the display lighting device of the camera (for example, as disclosed in Japanese Laid-open Patent Application No. 3-5741).

However, the conventional display lighting devices for the camera and the accessory equipment as described above are not so designed that when the operating member of the accessory equipment is manipulated, the display lighting device of the camera is turned on. Therefore, the conventional display lighting device for each of the camera and the accessory equipment have been defective in its operational performance.

SUMMARY OF THE INVENTION

An object of this invention is to provide a display lighting device for each of a camera and an accessory equipment of the camera, in which a respective lighting unit for lighting each of display screens of the camera and the accessory equipment are turned on and turned off mutually interlockingly with each other.

This invention is applied to a display lighting device which includes lighting means for lighting a display screen of a display unit and an operating member for outputting a turning on signal and a turning off signal to the lighting means. In order to attain the above object, the display lighting device includes communicating means for communicating information between a camera and an accessory equipment of the camera, and control means for turning on or turning off the lighting means of the camera and the accessory equipment interlockingly with each other through the communicating means when any one of the operating members of the camera and the accessory equipment is operated.

A display lighting device for a camera having lighting means for lighting a display screen of a display unit and an operating member for outputting a turning on signal and a turning off signal of the lighting means, includes communicating means for making communication with an accessory equipment of the camera and control means for controlling a turning on and a turning off of the lighting means. The control means turns on the lighting means when the turning on signal is received from the operating member and when a turning on command is received from the accessory equipment through the communicating means, respectively. On the other hand, the control means turns off the lighting means when the turning off signal is received from the operating member and when a turning off command is received from the accessory equipment through the communicating means, respectively. Further, the control means transmits a turning on command to the accessory equipment when the turning on signal is received from the operating member and a turning off command to the accessory equipment when the turning off signal is received from the operating member.

A display lighting device for an accessory equipment of a camera having lighting means for lighting a display screen of a display unit and an operating member for outputting a turning on signal and a turning off signal of the lighting means, includes communicating means for making communication with the camera and control means for controlling a turning on and a turning off of the lighting means. The control means turns on the lighting means when the turning on signal is received from the operating member and when a turning on command is received from the camera through the communicating means, respectively. On the other hand, the control means turns off the lighting means when the turning off signal is received from the operating member and when a turning off command is received from the camera through the communicating means, respectively. Further, the control means transmits a turning on command to the camera when the turning on signal is received from the operating member and a turning off command to the camera when the turning off signal is received from the operating member.

DETAILED DESCRIPTION OF PREFERRED EMBODIMENTS

First Embodiment

A first embodiment in which a camera is equipped with an electronic flash device to perform a flash photography will be described.

Figure 1:
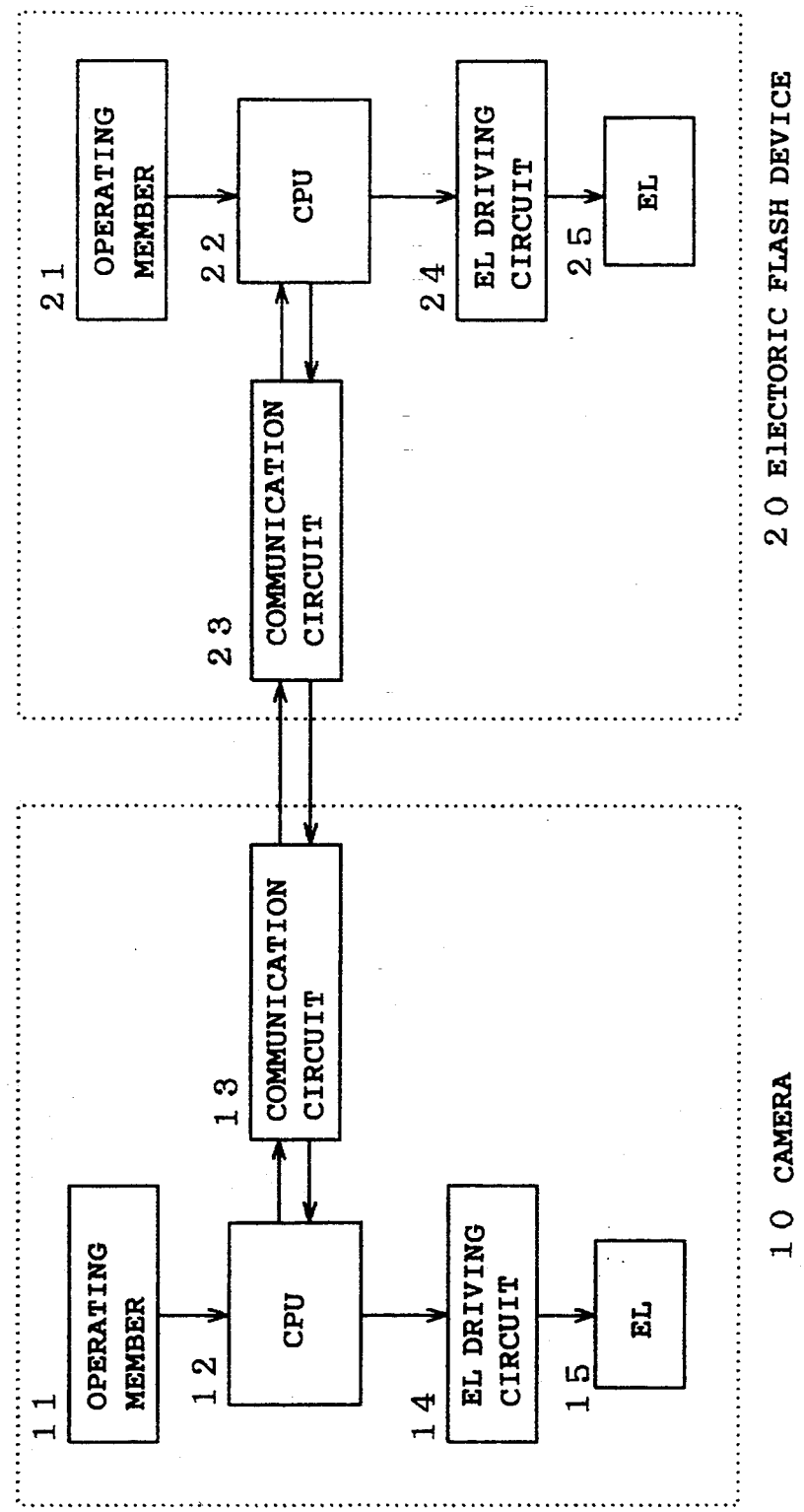
FIG. 1 is a block diagram showing the construction of a first embodiment.

FIG. 1 is a block diagram showing the construction of a camera 10 and an electronic flash device mounted on the camera 10. Of the constituting elements of the camera 10 and the electronic flash device 20 mounted on the camera 10, those elements which are not directly related to this invention are eliminated from the drawings and the following description.

Each of the camera 10 and the electronic flash device 20 is equipped with a display unit as not shown. The camera 10 includes an electroluminescence (hereinafter referred to as "EL") 15 for lighting a display screen of the display unit, an EL driving circuit 14 for applying a voltage to the EL 15 to allow the EL 15 to turning on, an operating member 11 for turning on or turning off of the EL 15, a communication circuit 13 for making communication with the electronic flash device 20 through an accessory shoe as not shown at a predetermined time interval, and a microcomputer (hereinafter referred to as "CPU") 12 for controlling the EL driving circuit 14 and the communication circuit 13.

The electronic flash device 20 includes an EL 25 for lighting a display screen of a display unit, an EL driving circuit 24 for applying a voltage to the EL 25 to allow the EL 25 to be turned on, an operating member 21 for turning on or turning off of the EL 25, a communication circuit 23 for making communication with the camera 10 through the accessory shoe at a predetermined time interval, and a CPU 22 for controlling the EL driving circuit 24 and the communication circuit 23.

Each of the operating members 11 and 21 is a push-button type of operating member and each of the ELs 15 and 25 is alternately turned on through its repetitive operation. When the camera 10 and the electronic flash device 20 are coupled to each other in such a manner that they are not interlockingly operated, the ELs 15 and 25 are individually driven to be turned on using each of the operating members 11 and 21.

In this embodiment, the operating members 11 and 21 are exclusively used to turn on or turn off the respective ELs 15 and 25. However, the display lighting device may be so designed that the respective ELs 15 and 25 are turned on by manipulation of an operating member such as a shutter release button, a photography mode selector, a shutter dial or the like for the camera, for example. In this case, a timer may be used and the ELs 15 and 25 may be turned off when a predetermined time is measured by the timer after the turning on of the ELs 15 and 25. Further, the turning on and turning off operations using the above operating members including shutter release button for example and the turning on and turning off operations using the exclusive operating member may be used in combination.

This embodiment is described for a case where the EL is used. However, the display lighting device is not limited to the EL, and for example may be an LED, a lamp or the like.

Figure 2:
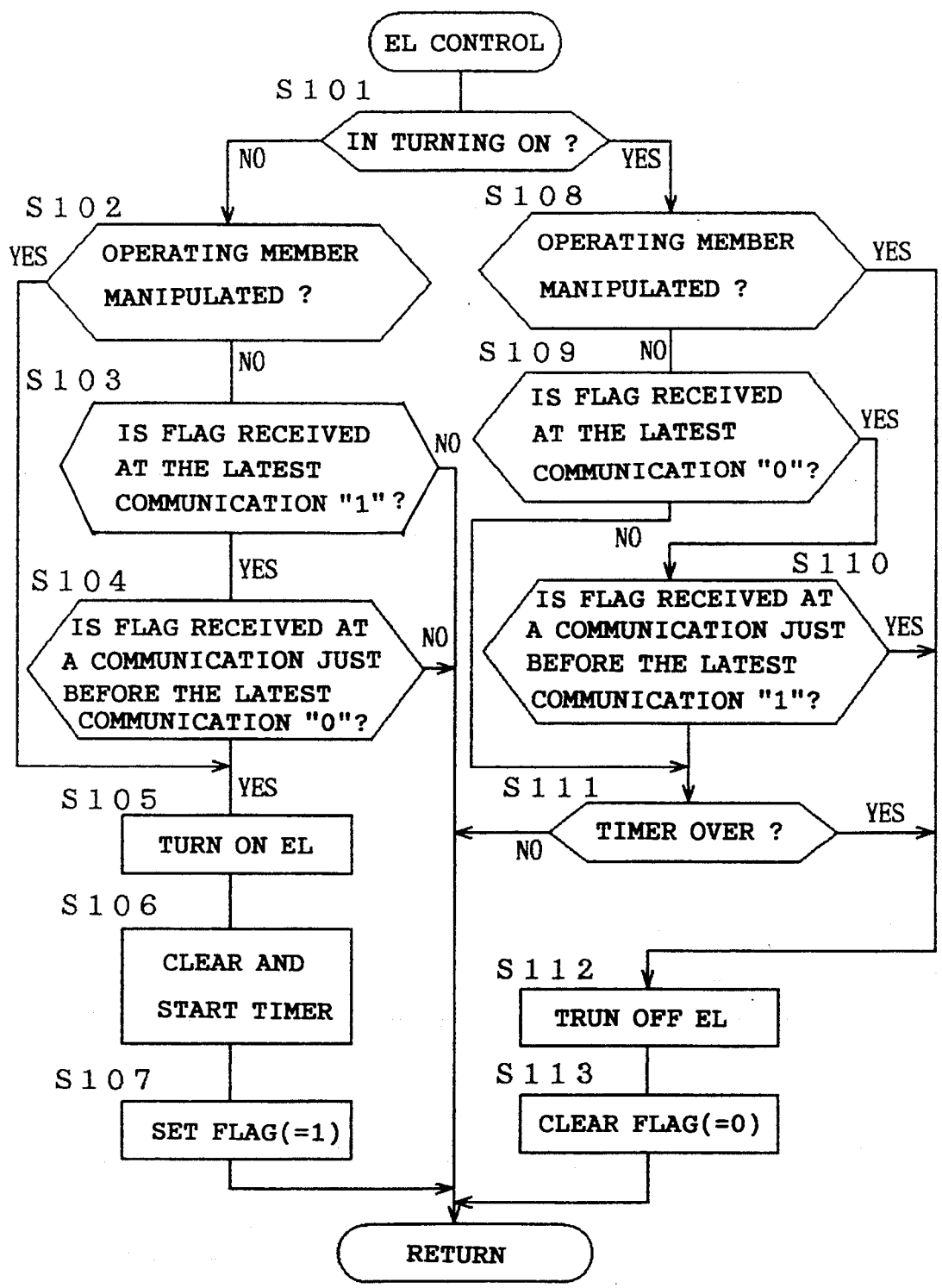
FIG. 2 is a flowchart for a display lighting control sub-routine of the first embodiment.

FIG. 2 is a flowchart for an EL control sub-routine executed by the CPUs 12 and 22. The EL control sub-routine for each of the ELs of the camera 10 and the electronic flash device 20 can be commonly used, and it is periodically read out from a main program of each of the camera 10 and the electronic flash device 20 and executed, so that the display lighting device of each of the camera 10 and the electronic flash device 20 is turned on and turned off. The following description is made representatively for a case where the EL control sub-routine is executed by the CPU 12 of the camera 10.

In this embodiment, an EL turning on flag for camera and an EL turning on flag for electronic flash device are communicated between the camera 10 and the electronic flash device 20. The former is set (flag=1) upon the turning on of the EL 15 of the camera 10, and reset (flag=0) upon the turning off of the EL 15. This flag information is transmitted from the camera 10 to the electronic flash device 20. The latter is set (flag=1) upon the turning on of the EL 25 of the electronic flash device 20, and reset (flag=0) upon the turning off of the EL 25. This flag information is transmitted from the electronic flash device 20 to the camera 10.

At a step S101, it is judged whether the EL 15 is being turned on. If the EL 15 is judged not to be turned on, the program goes to a step S102 to carry out the turning on control. On the other hand, if the EL 15 is judged to be turned on, the program goes to a step S108 to carry out the turning off control.

At a step S102, it is judged whether the operating member 11 is manipulated. If the manipulation is judged, the program goes to a step S105 to unconditionally start the turning on of the EL 15 because the operating member 11 is manipulated in the turning off of the EL 15. On the other hand, if the operating member 11 is judged not to be manipulated, the program goes to a step S103, and it is judged whether the EL turning on flag for electronic flash device which has been received in the latest communication with the electronic flash device 20 is "1". If the EL turning on flag for electronic flash device is judged to be "1", the EL 25 of the electronic flash device 20 has been already turned off. If the EL 15 of the camera 10 is turned on immediately after the judgement is made that the EL turning on flag for electronic flash device is "1", there is possibility that the EL turning on flag information is varied due to a communication error or the like, and thus the EL 15 is erroneously turned on due to erroneous information. In order to prevent such an unfavorable event, at a step S104, it is judged whether the EL turning on flag for electronic flash device, which was received in the communication immediately before the latest communication, was "0". If the EL turning on flag is judged to be "0", the program goes to a step S105 in which the EL 15 is turned on. That is, the variation of the EL turning on flag for electronic flash device from "0" to "1" is confirmed, and then the EL 15 of the camera 10 is turned on.

When at the step S103 the EL turning on flag for electronic flash device received at the latest communication is judged not to be "1", that is, the EL 25 of the electronic flash device 20 is being turned off, the program returns to the main program. On the other hand, if at the step S103 when the EL turning on flag for electronic flash device, which has been received at the latest communication is judged to be "1" and at the step S104 the EL turning on flag for electronic flash device, which was received at the communication prior to the latest communication, is judged not to be "0", the program returns to the main program.

At a step S106, an EL turning on timer for counting a turning on time of the EL 15 is cleared and started, then at a subsequent step S107 the EL turning on flag for camera is set to "1", and then the program returns to the main program. Through these steps, information on the turning on of the EL 15 of the camera 10 at a next communication with the electronic flash device 20 can be transmitted to the electronic flash device 20.

Upon the turning on of the EL 15 of the camera 10 once, the judgement of the step S101 at a next execution time of the sub-routine becomes "Yes", and the program goes to a step S108. At the step S108, it is judged whether the operating member 11 is manipulated. If the manipulation of the operating member 11 is judged, the program goes to a step S112 in which the EL 15 is unconditionally turned off because the operating member 11 is manipulated in the turning on of the EL 15. On the other hand, if the operating member 11 is judged not to be manipulated, the program goes to a step S109 to judge whether the EL turning on flag for electronic flash device, which has been received at the latest communication with the electronic flash device 20, is "0". If this EL turning on flag for electronic flash device is judged to be "0" the EL 25 has been already turned off, the EL 15 of the camera 10 is turned off immediately after this EL turning on flag for electronic flash device is judged to be "0", there is possibility that the EL turning on flag information is varied due to a communication error or the like, and thus the EL 25 is erroneously turned off due to erroneous information. In order to prevent such an unfavorable event, at a step S110, it is judged whether the EL turning on flag for electronic flash device, which was received at the communication just prior to the latest communication, was "1". If this EL turning on flag is judged to be "1", the program goes to a step S112 in which the EL 15 is turned off. That is, the variation of the EL turning on flag for electronic flash device from "1" to "0" is confirmed, and then the EL 15 of the camera 10 is turned off. After the EL 15 is turned off, the EL turning on flag for camera is set to "0" at a step S113, and then the program returns to the main program.

When at the step S109 the EL turning on flag for electronic flash device received at the latest communication is judged not to be "0", that is, the EL 25 of the electronic flash device 20 is in the turning on, the program goes to a step S111. On the other hand, if at the step 109 the EL turning on flag for electronic flash device received at the latest communication time is judged to be "0" and at the step 110 the EL turning on flag for electronic flash device received at the communication just before the latest communication is judged not to be "1", the program goes to the step S111.

At the step S111, it is judged whether the EL turning on timer for counting the turning on time of the EL 15 finishes to count a predetermined time. If the judgment at the step S111 is "Yes", the program goes to a step S112 in which the EL 15 is turned off, and if the judgment at the step S111 is "No", the program returns to the main program.

The same operation as described above is carried out when the EL control sub-routine is executed by the CPU 22 of the electronic flash device 20.

Figure 3:
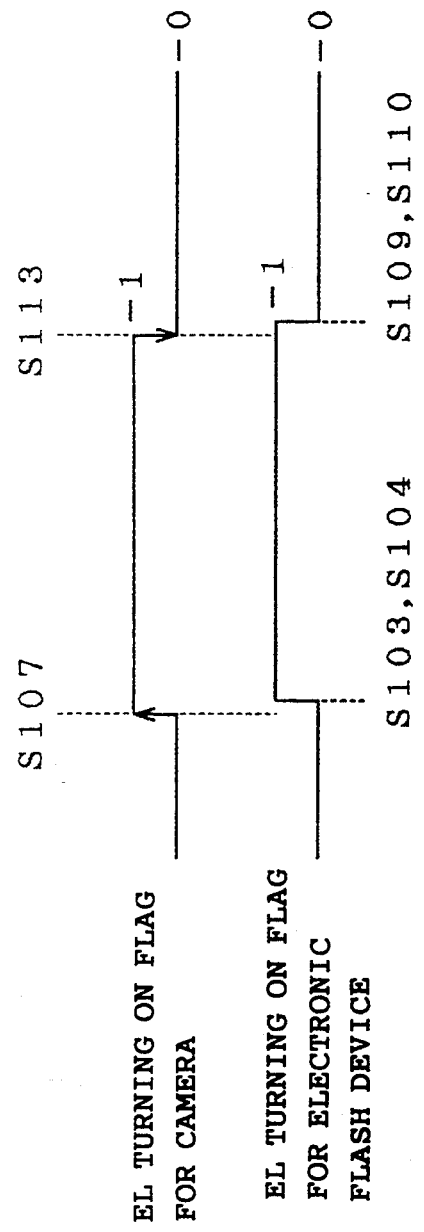
FIG. 3 is a time chart showing variation of an EL turning on flag of a camera and an EL turning on flag of an electrical flash device.

FIG. 3 is a time chart showing states of the EL turning on flags for the camera and the electronic flash device when the EL 15 is turned on and turned off by manipulating the operating member 11 of the camera 10.

When the operating member 11 of the camera 10 is manipulated to turning on the EL 15, the EL turning on flag for camera is set to "1" at the step S107 in the above-described flowchart as shown in FIG. 2. The electronic flash device 20 receives this EL turning on flag for camera at the subsequent communication with the camera 10, and the turning on of the EL 15 of the camera 10 is confirmed at the steps S103 and 104. Thereafter, EL 25 of the electronic flash device 20 is turned on, and the EL turning on flag for electronic flash device is set to "1".

On the other hand, when the operating member 11 of the camera 10 is manipulated to turning off the EL 15, the EL turning on flag for camera is set to "0" at the step S113. The electronic flash device 20 receives this EL turning on flag for camera at the subsequent communication with the camera 10, and the turning off of the EL 15 of the camera 10 is confirmed at the steps S109 and S110. Thereafter, the EL 25 of the electronic flash device 20 is turned off, and the EL turning on flag for electronic flash device is set to "0".

The functions of the steps S104 and S110 in the flowchart as shown in FIG. 2 will be described. As shown in FIG. 3, there is a time lag from the time when the EL 15 of the camera 10 is started to be turned on and the EL turning on flag for camera is changed to "1" to the time when the EL 25 of the electronic flash device 20 is started to be turned on and the EL turning on flag for electronic flash device is changed to "1". At the execution time of this sub-routine after the EL 15 is turned on, a turning off processing step which is subsequent to the step S108 is carried out in the CPU 12. If there is no step S110 in the program as shown in FIG. 2, the CPU 12 of the camera 10 executes the step S109 during the time lag period as described above, and the program goes to the step S112 in which the EL 15 is turned off because the EL turning on flag for electronic flash device remains "0".

On the other hand, there is a time lag from the time when the EL 15 of the camera 10 is started to be turned off and the EL turning on flag for camera is changed to "0" to the time when the EL 25 of the electronic flash device 20 is started to be turned off and the EL turning on flag for electronic flash device is changed to "0". At the execution time of this sub-routine after the EL 15 is turned off, a turning on processing step which is subsequent to the step S102 is carried out in the CPU12. If there is no step S104 in the program as shown in FIG. 2, the CPU 12 of the camera 10 executes the step S103 during the time lag period as described above, and the program goes to the step S105 to conduct the turning on of the EL15 because the EL turning on flag for electronic flash device remains "1".

The same unfavorable event occurs in the camera 10 when the EL 25 of the electronic flash device 20 is turned on and turned off.

In order to avoid such an unfavorable event, at the step S104 or step S110, the variation of the EL turning on flag, that is, the turning on or turning off state of the EL at the other side is surely detected, and the EL at this side is turned on and turned off on the basis of the detection result.

As described above, the EL 15 for lighting the display unit of the camera 10 is turned on and turned off not only by the operating member 11 of the camera 10, but also in response to the turning on or turning off signal of the EL 25 for lighting the display unit of the electronic flash device 20, which is obtained through the communication circuit 13. Further, the turning on signal and the turning off signal are transmitted through the communication circuit 13 to the electronic flash device 20 when the EL 15 of the camera 10 is being turned on and turned off, respectively. On the other hand, the EL 25 for lighting the display unit of the electronic flash device 20 is turned on and turned off not only by the operating member 21 of the electronic flash device 20, but also in response to the turning on or turning off signal of the EL 15 of the camera 10 which is obtained through the communication circuit 23. Further, the turning on signal and the turning off signal are transmitted through the communication circuit 23 to the camera 10 when the EL 25 of the electronic flash device 20 is turned on and turned off, respectively.

According to the above construction of the display lighting device for each of the camera 10 and the electronic flash device 20, for a flash photographic operation, both ELs 15 and 25 can be turned on and turned off by manipulating any one of the operating member 11 of the camera 10 and the operating member 21 of the electronic flash device 20, and thus the operational performance of turning on and turning off of the ELs 15 and 25 can be improved. In addition, both of the ELs 15 and 25 are so designed that the turning off of the ELs 15 and 25 are carried out after a predetermined time elapses from the turning on thereof when a user forgets the turning off operation of the ELs 15 and 25, so that vain consumption of a cell can be prevented.

Second Embodiment

In the first embodiment as described above, the ELs 15 and 25 are turned off when the time count of the EL turning on timer of the CPU 12 or CPU 22 exceeds a predetermined time after the EL 15 or the EL 25 is started to be turned on. In this case, if there is a difference in set time between the EL turning on timer of the camera 10 and the EL turning on timer of the electronic flash device 20, the ELs 15 and 25 are turned off when the EL turning on timer having shorter set time completes it's time counting of the predetermined time.

Usually, the camera 10 has a larger amount of display contents on the display unit thereof than the electronic flash device 20, and thus it takes a longer time to confirm the display content on the display unit of the camera 10 at a dark place. Therefore, the EL turning on timer of the camera 10 is set to be a longer time than the EL turning on timer of the electronic flash device 20. However, in the first embodiment, the ELs 15 and 25 is usually turned off by the EL turning on timer of the electronic flash device 20 whose set time is shorter than that of the camera 10, and thus there occurs an unfavorable event that the EL 15 is turned off before a user sufficiently checks the display content of the display unit of the camera 10.

In view of the foregoing, the second embodiment with which the above unfavorable event can be prevented will be next described.

The second embodiment uses a turning on factor flag which is set when the turning on operation is conducted on the EL by the operating member for turning on of this EL without the turning on signal received through the communication between the camera 10 and the electronic flash device 20. In a case where the EL is turned on by the operating member for this EL, even when the set time of the EL turning on timer at the other side is up and thus the EL at the other side is turned off, the EL at this side does not is turned off interlockingly. When the EL turning on timer at this side is up, the EL is turned off. On the other hand, in a case where the EL is turned on by the operating member for another EL, the EL is turned off interlockingly with the time-up of the EL turning on timer at the other side and thus the other EL is turned off.

Figure 4:
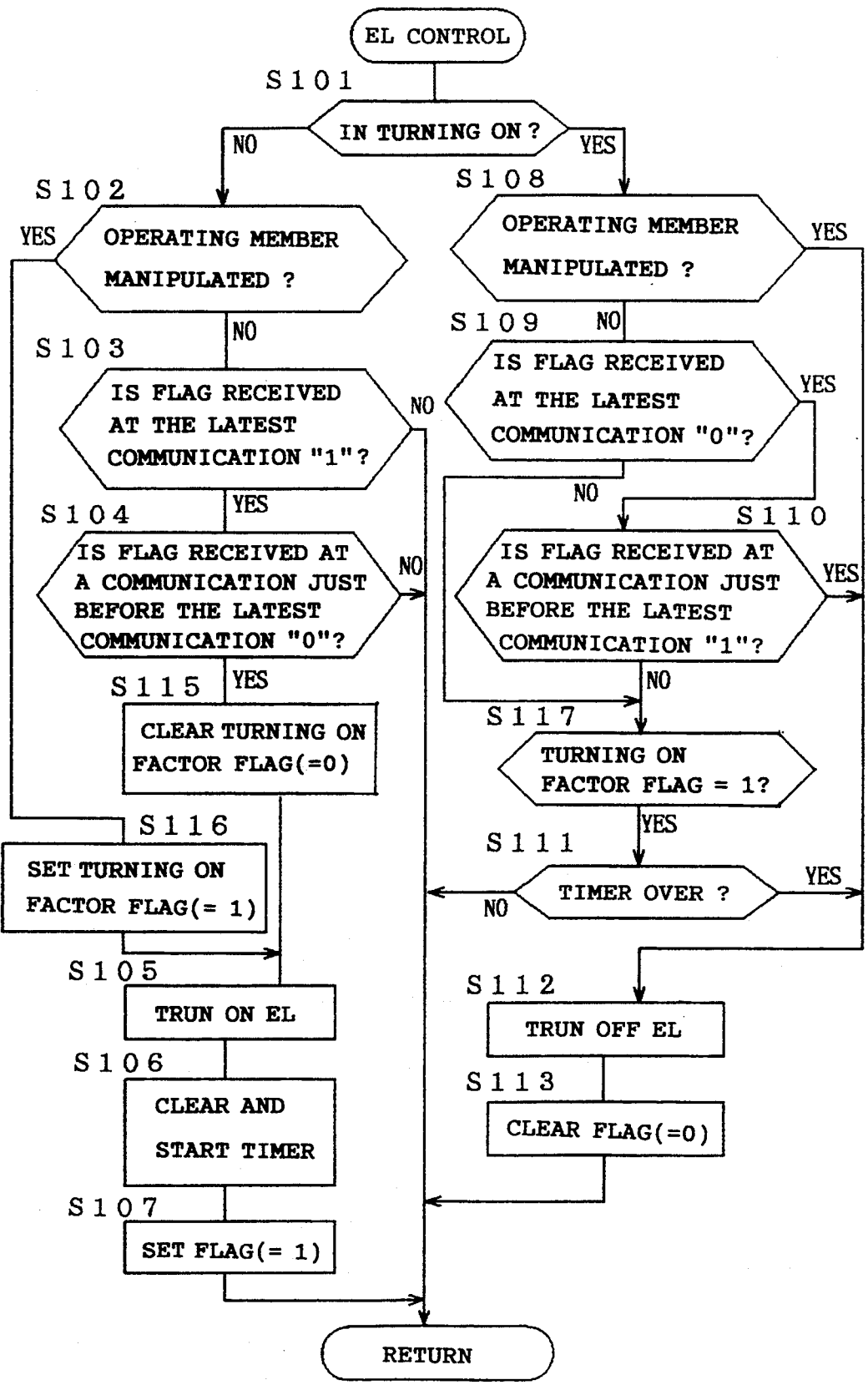
FIG. 4 is a flowchart for a display lighting control sub-routine of a second embodiment.

FIG. 4 is a flowchart for an EL control sub-routine of the second embodiment which is executed by the CPU 12 or CPU 22. The operation of the second embodiment will be described with reference to this flowchart. The construction of the device is identical to that of the first embodiment as shown in FIG. 1, and the description thereof is eliminated. The steps at which the same processing as shown in the flowchart of FIG. 2 are executed are represented by the same step numbers, and the different points between the first and second embodiments will be mainly described.

If it is judged that the EL is turned on by the operating member (11 or 21) at the step S102, the program goes to a step S116 to set the turning on factor flag to "1". On the other hand, if the turning on operation by the operating member (11 or 21) is not carried out and both judgments at the steps S103 and S104 are affirmative so that the EL turning on flag received from the other side causes the EL to be turned on, the program goes to a step S115 to set the turning on factor flag to "0".

If at the step S109 the EL turning on flag, which has been received at the latest communication, is judged not to be "0", or if at the step S109 the EL turning on flag received at the latest communication is judged to be "0" and at the step S110 the EL turning on flag received at the communication just before the latest communication is judged not to be "1", the program goes to a step S117 to judge whether the turning on factor flag is "1". If the turning on factor flag is "1", that is, if the EL is turned on by the manipulation of the corresponding operating member (11 or 21), the program goes to the step S111 in which the EL is turned off when the EL turning on timer is time-up.

As described above, only the EL, which has been turned on by the corresponding operating member (11 or 21), can be turned off when the corresponding EL turning on timer is time-up. That is, in a case where ELs 15 and 25 are turned on by the operation of the operating member 11 of the camera 10, when the EL turning on timer of the camera 10 which is beforehand set to a turning on time optimum to the camera 10 is time-up, the EL 15 of the camera 10 is turned off, while the EL 15 of the camera 10 is not turned off interlockingly with turning off of the EL 25 in response to the time-up of the EL turning on timer of the electronic flash device 20. On the other hand, in a case where the ELs 15 and 25 are turned on by the operation of the operating member 21 of the electronic flash device 20, when the EL turning on timer of the electronic flash device 20 which is beforehand set to a turning on time optimum to the electronic flash device 20 is time-up, the EL 25 of the electronic flash device 20 turns out, and when the EL turning on timer of the camera 10 is time-up, the EL 15 is turned off. Through these operations, the display lighting is carried out for an optimum time in each device, and the display content can be sufficiently confirmed.

The first and second embodiments may be combined in any manner. For example, the above operation can be carried out with no trouble even if the camera 10 adopts the program of the first embodiment and the electronic flash device 20 adopts the program of the second embodiment.

The EL turning on timer of the camera 10 may turn off the EL 25 of the electronic flash device 20. In this case, the CPU 12 of the camera 10 executes the EL control sub-routine as shown in FIG. 2, and the CPU 22 of the electronic flash device 20 executes the EL control sub-routine as shown in FIG. 5.

Figure 5:
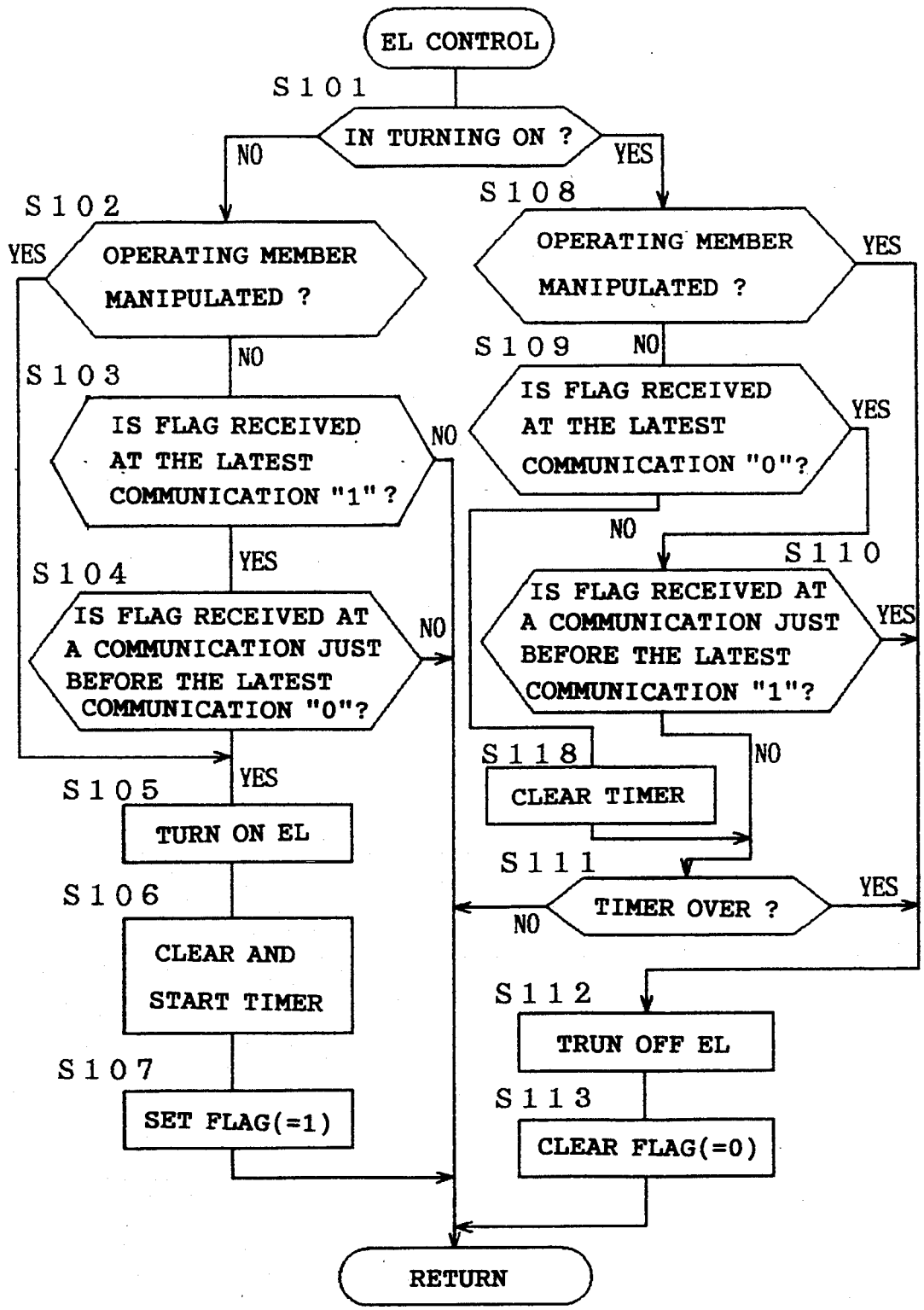
FIG. 5 is a flowchart for a modification of the second embodiment.

FIG. 5 is a flowchart for the sub-routine as shown in FIG. 2 which is newly added with a step S118. The program in the CPU 22 of the electronic flash device 20 goes to the step S118 when judging at the step S109 that the EL turning on flag for camera received at the latest communication is not "0", that is, the EL 15 of the camera 10 is being turned on, so that the EL turning on timer of the electronic flash device 20 is cleared.

Through this operation, the turning off operation by the EL turning on timer is carried out using only the EL turning on timer of the camera 10.

In each embodiment as described above, the electronic flash device is representatively used as an accessory. However, this invention may be applied to an accessory equipment of the camera having a display unit such as a data back, a remote control unit, etc.

What is claimed is:

1. In a camera system having a camera and an accessory equipment, each of said camera and said accessory equipment comprising:
a display unit including a lighting device to light a display screen of said display unit,
an operating member to be operated by a user of the camera system, and
a control circuit responsive to said operating member to control said lighting device and to output a turning on signal and a turning off signal;
said camera and said accessory equipment defining first and second devices, and said control circuits of said camera and of said accessory equipment defining first and second control circuits that communicate between said first and second devices in order to transfer said turning on signal and said turning off signal between said first and second devices, said first control circuit of said first device turning on said lighting device of said first device in response to said turning on signal from said second control circuit of said second device, and said second control circuit of said second device turning off said lighting device of said second device in response to said turning off signal from said first control circuit of said first device.

2. A camera system according to claim 1, wherein said first control circuit of said first device turns on said lighting device of said first device when said turning off signal is received by said first control circuit at a communication immediately before a latest communication with said second control circuit of said second device and said turning on signal is received at the latest communication with said second control circuit of said second device, and said first control circuit turns off said lighting device of said first device when said turning on signal is received at the communication immediately before the latest communication with said second control circuit of said second device and a turning off signal is received am the latest communication with said second control circuit of said second device.

3. A camera system according to claim 1, wherein said first control circuit of said first device turns off said lighting device of said first device when a predetermined time elapses from the turning on of said lighting device of said first device irrespective of presence of said turning off signal from said first device and said turning off signal from said second device.

4. A camera system according to claim 1, wherein when said lighting device of said first device is turned on in response to said turning on signal from said first device, said first control circuit of said first device turns off said lighting device of said first device when a predetermined time elapses from the turning on of said lighting device of said first device.

5. A camera system according to claim 1, wherein said accessory equipment comprises an electronic flash device having a display unit.

6. A camera system according to claim 1, wherein said accessory equipment comprises a data back having a display unit.

7. A camera system according to claim 1, wherein said accessory equipment comprises a remote control unit having a display unit.

8. In a camera system having a camera and an accessory equipment, each of said camera and said accessory equipment comprising:
a display unit including a lighting device to light a display screen of said display unit,
an operating member to be operated by a user of the camera system, and
a control circuit responsive to said operating member to control said lighting device and to output a turning on signal and a turning off signal;
said camera and said accessory equipment defining first and second devices, and said control circuits of said camera and of said accessory equipment defining first and second control circuits that communicate between said first and second devices in order to transfer said turning on signal and said turning off signal between said first and second devices, said first circuit of said first device turning on said lighting device of said first device when said turning off signal is received at a communication immediately before a latest communication with said second control circuit of said second device and said turning on signal is received at the latest communication with said second control circuit of said second device, and turning off said lighting device of said first device when said turning on signal is received at a communication immediately before the latest communication with said second control circuit of said second device and a turning off signal is received at the latest communication with said second control circuit of said second device.

9. A camera system according to claim 8, wherein said first control circuit of said first device turns off said lighting device of said first device when a predetermined time elapses from the turning on of said lighting device of said first device irrespective of presence of said turning off signal from said first device and said turning off signal from said second device.

10. A camera system according to claim 8, wherein when said lighting device of said first device is turned on in response to said turning on signal from said first device, said control circuit of said first device turns off said lighting device of said first device when a predetermined time elapses from the turning on of said lighting device of said first device.

11. A camera system comprising:
a camera having: a camera display unit that includes a camera lighting device to light a display screen of said camera display unit; a camera operating member to be operated by a user of the camera system; and a camera control circuit responsive to said camera operating member to control said camera lighting device and to output a turning on signal and a turning off signal;
an accessory equipment having: an accessory display unit that includes an accessory lighting device to light a display screen of said accessory display unit; an accessory operating member to be operated by the user of the camera system; and an accessory control circuit responsive to said accessory operating member to control said accessory lighting device and to output a turning on signal and a turning off signal;
said camera control circuit and said accessory control circuit communicating with each other to transfer the turning on signals and the turning off signals between said camera control circuit and said accessory control circuit, said accessory control circuit turning on said accessory lighting device in response to said turning on signal from either of said camera control circuit and said accessory control circuit, said camera control circuit turning off said camera lighting device in response to said turning off signal from either of said camera control circuit and said accessory control circuit.

* * * * *